United States Patent
Gopalakrishnan et al.

(10) Patent No.: US 10,970,095 B2
(45) Date of Patent: Apr. 6, 2021

(54) OBTAINING INSIGHTS FROM A DISTRIBUTED SYSTEM FOR A DYNAMIC, CUSTOMIZED, CONTEXT-SENSITIVE HELP SYSTEM

(71) Applicant: International Business Machines Corporation, Armonk, NY (US)

(72) Inventors: Bharath Gopalakrishnan, Bangalore (IN); Albee Jhoney, Bangalore (IN); Sundaravelu Shanmugam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 16/270,303

(22) Filed: Feb. 7, 2019

(65) Prior Publication Data
US 2019/0171469 A1     Jun. 6, 2019

Related U.S. Application Data

(63) Continuation of application No. 15/099,735, filed on Apr. 15, 2016, now Pat. No. 10,241,809.

(51) Int. Cl.
*G06F 9/451* (2018.01)
*G06F 40/169* (2020.01)

(52) U.S. Cl.
CPC ............ *G06F 9/453* (2018.02); *G06F 40/169* (2020.01)

(58) Field of Classification Search
CPC .. G06F 17/30011; G06F 9/453; G06F 17/241; G06F 17/30554; G06F 17/30867
(Continued)

(56) References Cited

U.S. PATENT DOCUMENTS 6,246,404 B1   6/2001   Feigner et al.
6,452,607 B1   9/2002   Livingston
(Continued)

FOREIGN PATENT DOCUMENTS

WO     2015027844 A1     3/2015

OTHER PUBLICATIONS

"View or change the properties for an Office file—Office Support"; retrieved from https://support.office.com/en-us/article/View-or-change-the-properties-for-an-Office-file-21d604c2-481e-4379-8e54-1dd4622c6b75; 2016.
(Continued)

*Primary Examiner* — Syed H Hasan
*Assistant Examiner* — Nicholas E Allen
(74) *Attorney, Agent, or Firm* — Brown & Michaels, PC; Christopher Pignato

(57) ABSTRACT

A context-sensitive help system for obtaining insights from a target environment in an unobtrusive manner. The context-sensitive help system detects a search or opening of a help document containing a plurality of placeholders and product/component names by a user; crawls documents in the knowledgebase and extracts product and/or component names and corresponding configuration parameters or placeholders; stores the product and/or component names and placeholders in the placeholder dictionary along with links and an index to documents in the knowledgebase. The system extracts insights from the target environment in an unobtrusive manner; and replaces placeholders in the help document with values from the target environment based on the insights from the target environment; and then displays the help document to the user.

14 Claims, 12 Drawing Sheets

(58) Field of Classification Search
USPC .......................................................... 707/722
See application file for complete search history.

(56) References Cited

U.S. PATENT DOCUMENTS

| | | | |
|---|---|---|---|
| 6,467,081 B2 | 10/2002 | Vaidyanathan et al. | |
| 7,636,887 B1 | 12/2009 | Kinnucan, Jr. | |
| 7,814,420 B2 | 10/2010 | Gerhart et al. | |
| 7,849,392 B2 | 12/2010 | Rapp et al. | |
| 8,099,664 B2 | 1/2012 | Kureshy et al. | |
| 8,151,192 B2 | 4/2012 | Black et al. | |
| 8,307,341 B2 | 11/2012 | Eykholt | |
| 9,122,496 B1 | 9/2015 | Jhoney et al. | |
| 9,690,444 B1* | 6/2017 | Joyce | G06F 3/0481 |
| 2003/0028513 A1* | 2/2003 | Pawar | H04L 41/046 |
| 2006/0206866 A1* | 9/2006 | Eldrige | G05B 19/41845 |
| | | | 717/122 |
| 2007/0220429 A1* | 9/2007 | Kureshy | G06F 9/453 |
| | | | 715/708 |
| 2008/0120129 A1* | 5/2008 | Seubert | G06Q 10/10 |
| | | | 705/35 |
| 2009/0164900 A1* | 6/2009 | Shewchuk | G06F 9/44526 |
| | | | 715/714 |
| 2009/0183066 A1 | 7/2009 | Crawford et al. | |
| 2010/0146483 A1 | 6/2010 | Komarov et al. | |
| 2013/0041874 A1* | 2/2013 | Dohm | G06F 16/958 |
| | | | 707/705 |
| 2013/0239036 A1* | 9/2013 | MacDonald | G06F 16/283 |
| | | | 715/769 |
| 2013/0262987 A1* | 10/2013 | Tang | G06F 40/14 |
| | | | 715/239 |
| 2015/0067501 A1 | 3/2015 | Jhoney et al. | |
| 2015/0067645 A1* | 3/2015 | Jhoney | G06F 8/73 |
| | | | 717/123 |
| 2015/0074231 A1* | 3/2015 | Nigam | G06F 16/972 |
| | | | 709/219 |

OTHER PUBLICATIONS

Probert, M. "grep, awk and sed—three Very useful command-line utilities"; University of York; Nov. 2014.

"Find and replace text or other items"; retrieved from https://support.office.com/en-us/article/Find-and-replace-text-or-other-items-50b45f26-c4b8-4003-b9e4-315a3547f69c; 2016.

"Installing and managing the IBM Eclipse Help System"; retrieved from http://www.ibm.com/support/knowledgecenter/SSCQGF_6.1.1/com.ibm.IBMDI.doc_6.1.1/installing_and_managing.html; 2003.

List or Related Cases; 2019.

* cited by examiner

| Thread_Pool_Size (default) | Thread_Pool_Size (web/ORB container) | No_Of_Core | Avg_CPU_Utilization |
|---|---|---|---|
| 5 | 10 | 1 | 90% |
| 20 | 40 | 4 | 80% |
| 40 | 80 | 8 | 60% |
| 80 | 160 | 16 | 50% |

OBTAINING INSIGHTS FROM A DISTRIBUTED SYSTEM FOR A DYNAMIC, CUSTOMIZED, CONTEXT-SENSITIVE HELP SYSTEM

BACKGROUND

The present invention relates to a distributed system, and more specifically to obtaining insights from a distributed system for a dynamic, customized, context sensitive help system.

When a user, who may be a professional who uses the distributed system or a user who is responsible for the development and/or maintenance, is working with documents that describe components, elements or entities used in a complex and distributed environment, it is time consuming to obtain configuration values and the state of the complex and distributed environment.

For example, an IT engineer may refer to a troubleshooting document that describes the problem and a solution, in which the document uses placeholders like [INSTALL_DIR], <JAVA_HOME>, and SDBINST in its description. The IT engineer must remember or determine the state/values for the 100's or 1000's of systems that they work on, on a daily basis. Furthermore they must map the placeholder to a corresponding value of the complex and distributed environment.

In another example, while referring to a software deployment guide, a deployment engineer may not have access to the configuration, risk, compliance, etc of the complex and distributed environment due to security, business constraints and/or network constraints. The deployment guide may therefore, only be useful if placeholders are accessible and available in the context of the complex and distributed environment.

In yet another example, while referring to a runbook, a system administrator may have to compute settings based on a current state of the complex and distributed environment, relying strictly on the system administrator being able to apply the formula, guidelines and rules to compute the correct configuration values while referring to documents that describe the components, elements and/or entities used in the complex and distributed environment.

In all of the above examples, it is time consuming for the user to get the actual values of the placeholders from the complex and distributed environment. Furthermore, manually extracting the placeholders is error prone and may not always be available to the user due to certain constraints. Additionally, multiple rules and guidelines need to be taken into account in order to determine the actual configuration of the complex and distributed environment, which can be time consuming.

SUMMARY

According to one embodiment of the present invention, a method of using a context-sensitive help system for obtaining insights from a target environment in an unobtrusive manner. The context-sensitive help system uses a product placeholder extractor in communication with a knowledgebase of an external system and in communication with a placeholder dictionary, a placeholder value extractor in communication with the product placeholder extractor, the placeholder dictionary, other external systems, and a placeholder value cache; a help annotator system in communication with the placeholder value cache, the placeholder value extractor and other external systems. The method comprising the steps of a computer of the context-sensitive help system: detecting a search or opening of a help document containing a plurality of placeholders and product/component names by a user through an interface; crawling documents in the knowledgebase and extracting product and/or component names and corresponding configuration parameters or placeholders; storing the product and/or component names and placeholders in the placeholder dictionary along with links and an index to documents in the knowledgebase; extracting insights from the target environment in an unobtrusive manner; and replacing placeholders in the help document with values from the target environment based on the insights from the target environment; and displaying the help document to the user through the interface.

Replacing placeholders in the help document further comprising the steps of: receiving a request or search for help from the user regarding configuration settings of at least one component of the target environment; searching the placeholder value cache for all placeholder names that match a value; using the placeholder name to obtain a list of all help documents which refer to the placeholder name from the placeholder dictionary; and if the placeholder is a computed value; the computer reverse mapping the placeholder to placeholder names and getting a list of all help documents that refers back to all of the placeholder names.

According to one embodiment of the present invention, a method of using a context-sensitive help system for obtaining insights from a target environment in an unobtrusive manner. The context-sensitive help system uses a product placeholder extractor in communication with a knowledgebase of an external system and in communication with a placeholder dictionary, a placeholder value extractor in communication with the product placeholder extractor, the placeholder dictionary, other external systems, and a placeholder value cache; a help annotator system in communication with the placeholder value cache, the placeholder value extractor and other external systems. The method comprising the steps of a computer of the context-sensitive help system: detecting a search or opening of a help document containing a plurality of placeholders and product/component names by a user through an interface; crawling documents in the knowledgebase and extracting product and/or component names and corresponding configuration parameters or placeholders; storing the product and/or component names and placeholders in the placeholder dictionary along with links and an index to documents in the knowledgebase; extracting insights from the target environment in an unobtrusive manner; and replacing placeholders in the help document with values from the target environment based on the insights from the target environment; and displaying the help document to the user through the interface.

Replacing placeholders in the help document further comprising the steps of: receiving a request or search of help from the user regarding automation; filtering and narrowing down a scope of the search received from the user using insight and context information in the knowledgebase; detecting a user opens an input parameter through an interface associated with the automation; and dynamically updating fields of the interface with values obtained from the placeholder value cache.

According to another embodiment, a computer program product for using a context-sensitive help system for obtaining insights from a target environment in an unobtrusive manner. The context-sensitive help system uses a product placeholder extractor in communication with a knowledgebase of an external system and in communication with a placeholder dictionary, a placeholder value extractor in communication with the product placeholder extractor, the placeholder dictionary, other external systems, and a placeholder value cache; a help annotator system in communication with the placeholder value cache, the placeholder value extractor and other external systems. The method comprising the steps of a computer of the context-sensitive help system comprising a computer comprising at least one processor, one or more memories, one or more computer readable storage media, the computer program product comprising a computer readable storage medium having program instructions embodied therewith. The program instructions executable by the computer to perform a method comprising: detecting, by the computer, a search or opening of a help document containing a plurality of placeholders and product/component names by a user through an interface; crawling, by the computer, documents in the knowledgebase and extracting product and/or component names and corresponding configuration parameters or placeholders; storing, by the computer, the product and/or component names and placeholders in the placeholder dictionary along with links and an index to documents in the knowledgebase; extracting, by the computer, insights from the target environment in an unobtrusive manner; and replacing, by the computer, placeholders in the help document with values from the target environment based on the insights from the target environment; and displaying, by the computer, the help document to the user through the interface.

Replacing placeholders in the help document further comprising the program instructions of: receiving, by the computer, a request or search for help from the user regarding configuration settings of at least one component of the target environment; searching the placeholder value cache, by the computer, for all placeholder names that match a value; using, by the computer, the placeholder name to obtain a list of all help documents which refer to the placeholder name from the placeholder dictionary; and if the placeholder is a computed value; the computer reverse mapping the placeholder to placeholder names and getting a list of all help documents that refers back to all of the placeholder names.

According to another embodiment, a computer program product for using a context-sensitive help system for obtaining insights from a target environment in an unobtrusive manner. The context-sensitive help system uses a product placeholder extractor in communication with a knowledgebase of an external system and in communication with a placeholder dictionary, a placeholder value extractor in communication with the product placeholder extractor, the placeholder dictionary, other external systems, and a placeholder value cache; a help annotator system in communication with the placeholder value cache, the placeholder value extractor and other external systems. The method comprising the steps of a computer of the context-sensitive help system comprising a computer comprising at least one processor, one or more memories, one or more computer readable storage media, the computer program product comprising a computer readable storage medium having program instructions embodied therewith. The program instructions executable by the computer to perform a method comprising: detecting, by the computer, a search or opening of a help document containing a plurality of placeholders and product/component names by a user through an interface; crawling, by the computer, documents in the knowledgebase and extracting product and/or component names and corresponding configuration parameters or placeholders; storing, by the computer, the product and/or component names and placeholders in the placeholder dictionary along with links and an index to documents in the knowledgebase; extracting, by the computer, insights from the target environment in an unobtrusive manner; and replacing, by the computer, placeholders in the help document with values from the target environment based on the insights from the target environment; and displaying, by the computer, the help document to the user through the interface.

Replacing placeholders in the help document further comprising the program instructions of: receiving, by the computer, a request or search of help from the user regarding automation; filtering and narrowing down, by the computer, a scope of the search received from the user using insight and context information in the knowledgebase; detecting a user opens an input parameter, by the computer, through an interface associated with the automation; and dynamically updating fields, by the computer, of the interface with values obtained from the placeholder value cache.

According to another embodiment of the present invention, a computer system for using a context-sensitive help system for obtaining insights from a target environment in an unobtrusive manner. The context-sensitive help system uses a product placeholder extractor in communication with a knowledgebase of an external system and in communication with a placeholder dictionary, a placeholder value extractor in communication with the product placeholder extractor, the placeholder dictionary, other external systems, and a placeholder value cache; a help annotator system in communication with the placeholder value cache, the placeholder value extractor and other external systems. The context-sensitive help system comprising a computer comprising at least one processor, one or more memories, one or more computer readable storage media having program instructions executable by the computer to perform the program instructions comprising: detecting, by the computer, a search or opening of a help document containing a plurality of placeholders and product/component names by a user through an interface; crawling, by the computer, documents in the knowledgebase and extracting product and/or component names and corresponding configuration parameters or placeholders; storing, by the computer, the product and/or component names and placeholders in the placeholder dictionary along with links and an index to documents in the knowledgebase; extracting, by the computer, insights from the target environment in an unobtrusive manner; and replacing, by the computer, placeholders in the help document with values from the target environment based on the insights from the target environment; and displaying, by the computer, the help document to the user through the interface.

Replacing placeholders in the help document further comprising the program instructions of: receiving, by the computer, a request or search for help from the user regarding configuration settings of at least one component of the target environment; searching the placeholder value cache, by the computer, for all placeholder names that match a value; using, by the computer, the placeholder name to obtain a list of all help documents which refer to the placeholder name from the placeholder dictionary; and if the placeholder is a computed value; the computer reverse mapping the placeholder to placeholder names and getting a list of all help documents that refers back to all of the placeholder names.

According to another embodiment of the present invention, a computer system for using a context-sensitive help system for obtaining insights from a target environment in an unobtrusive manner. The context-sensitive help system uses a product placeholder extractor in communication with a knowledgebase of an external system and in communication with a placeholder dictionary, a placeholder value extractor in communication with the product placeholder extractor, the placeholder dictionary, other external systems, and a placeholder value cache; a help annotator system in communication with the placeholder value cache, the placeholder value extractor and other external systems. The context-sensitive help system comprising a computer comprising at least one processor, one or more memories, one or more computer readable storage media having program instructions executable by the computer to perform the program instructions comprising: detecting, by the computer, a search or opening of a help document containing a plurality of placeholders and product/component names by a user through an interface; crawling, by the computer, documents in the knowledgebase and extracting product and/or component names and corresponding configuration parameters or placeholders; storing, by the computer, the product and/or component names and placeholders in the placeholder dictionary along with links and an index to documents in the knowledgebase; extracting, by the computer, insights from the target environment in an unobtrusive manner; and replacing, by the computer, placeholders in the help document with values from the target environment based on the insights from the target environment; and displaying, by the computer, the help document to the user through the interface.

Replacing placeholders in the help document further comprising the program instructions of: receiving, by the computer, a request or search of help from the user regarding automation; filtering and narrowing down, by the computer, a scope of the search received from the user using insight and context information in the knowledgebase; detecting a user opens an input parameter, by the computer, through an interface associated with the automation; and dynamically updating fields, by the computer, of the interface with values obtained from the placeholder value cache.

DETAILED DESCRIPTION

In an illustrative embodiment of the present invention, the term "user" refers to professionals from different industries who are responsible for developing, maintaining and handling complex and distributed environments. The professional may be, but is not limited to, a system administrator, operator, development operations engineer or an individual who interacts with the system. The professionals may vary based on the industry (e.g. software, manufacturing, healthcare, travel & tourism, etc . . . )

In an illustrative embodiment of the present invention, the term "target environment" refers to the complex and distributed environment managed by the user. The state of this environment, for example including configuration, health, risk, compliance, etc., is available and accessible in digital form through appropriate instrumentation.

In an illustrative embodiment of the present invention, the term "SYSTEM" refers to a knowledgebase, for example documents, that describe the components, elements, and/or entities used in the target environment. This knowledgebase is typically hosted by the vendor or community of components, elements and/or entities. For example, a vendor publishes knowledgebase in the form of Technical Specification or Troubleshooting guides.

In an illustrative embodiment of the present invention, the term "placeholder" refers to keywords used in documents, such as [INSTALL_DIR], <JAVA_HOME>, $DB2INST, which refer to configuration values or state of the target environment.

In an illustrative embodiment of the present invention, the context-sensitive help system is used to dynamically find a suitable automation script/tool (instead of a procedure/document), and fill-in the parameter values contextually using the insight extracted from log-files & related commands. The 'parameters' of the automation script is equivalent to the 'placeholders' in the help document. The parameters of the automation script are obtained dynamically, by a placeholder value extractor (PVE). A help system (HS) is used to find the suitable automation.

Figure 12:
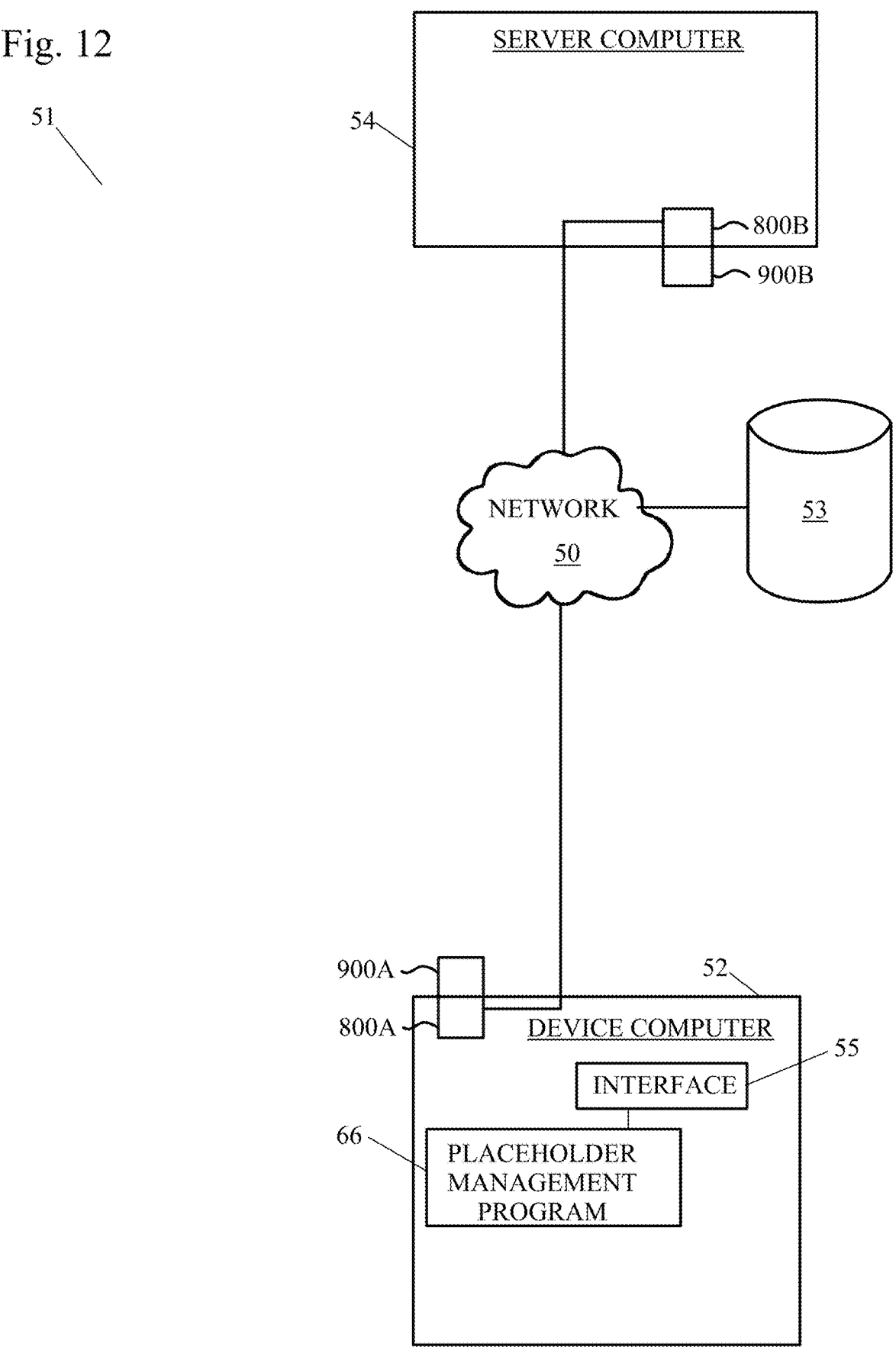
FIG. 12 depicts an exemplary diagram of a possible data processing environment in which illustrative embodiments may be implemented.

FIG. 12 is an exemplary diagram of a possible data processing environment provided in which illustrative embodiments may be implemented. It should be appreciated that FIG. 12 is only exemplary and is not intended to assert or imply any limitation with regard to the environments in which different embodiments may be implemented. Many modifications to the depicted environments may be made.

Referring to FIG. 12, a network data processing system such as the dynamic, customized, context-sensitive help system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, server computer 54 and a device computer 52 are all connected to network 50. In other exemplary embodiments, network data processing system 51 may include additional client computers, storage devices, server computers, and other devices not shown.

Figure 13:
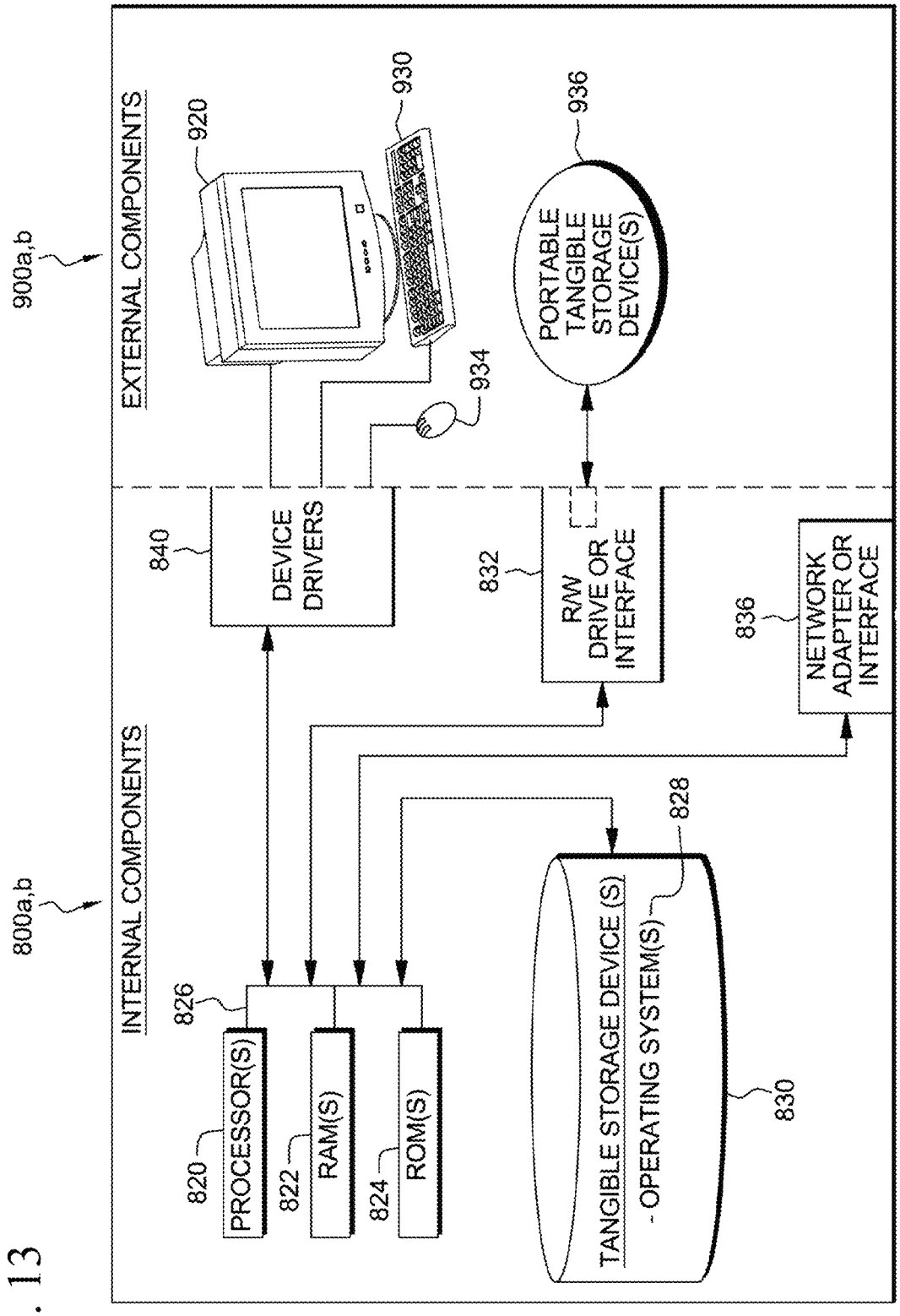
FIG. 13 illustrates internal and external components of a client computer and a server computer in which illustrative embodiments may be implemented.

The device computer 52 includes a set of internal components 800a and a set of external components 900a, further illustrated in FIG. 13. The device computer 52 may be, for example, a netbook, a laptop computer, a desktop computer, or any other type of computing device.

The device computer 52 may contain an interface 55. Through interface 55, first device computer 52 can communicate with the placeholder management program and/or the server computer 54, for example, through a command line interface, a graphical user interface (GUI), or a web user interface (WUI). The interface 55 communicates data about the contextual help documents to the device computer 52, for example through a placeholder management system program 66 which controls the programs of the context-sensitive help system. The interface 55 may also receive a search request, command to open a help document or a command regarding automation. The placeholder management program 66, as well as other programs, can communicate with other computers and the server computer 54 through the network 50.

Server computer 54 includes a set of internal components 800b and a set of external components 900b illustrated in FIG. 13. Server computer 54 may contain an interface. The interface can be, for example, a command line interface, a graphical user interface (GUI), or a web user interface (WUI) through which access to a placeholder management program 66 may occur. Alternatively, the placeholder management program 66 may be on server computer 54.

In the depicted example, server computer 54 may provide information, such as boot files, operating system images, and applications to device computer 52. Server computer 54 can compute the information locally or extract the information from other computers on network 50.

Program code and programs such as the placeholder management system program 66 may be stored on at least one of one or more computer-readable tangible storage devices 830 shown in FIG. 13, on at least one of one or more portable computer-readable tangible storage devices 936 as shown in FIG. 13, or on storage unit 53 connected to sever computer 54, or may be downloaded to a computer, such as device computer 52 or server computer 54, for use. For example, program code and programs such as placeholder management program 66 may be stored on at least one of one or more storage devices 830 on server computer 54 and downloaded to device computer 52 over network 50 for use on device computer 52. Alternatively, server computer 54 can be a web server, and the program code, and programs such as placeholder management program 66 may be stored on at least one of the one or more storage devices 830 on server computer 54 and accessed on device computer 52. In other exemplary embodiments, the program code, and programs such as placeholder management program 66 may be stored on at least one of one or more computer-readable storage devices 830 on device computer 52 or distributed between two or more servers.

Figure 1:
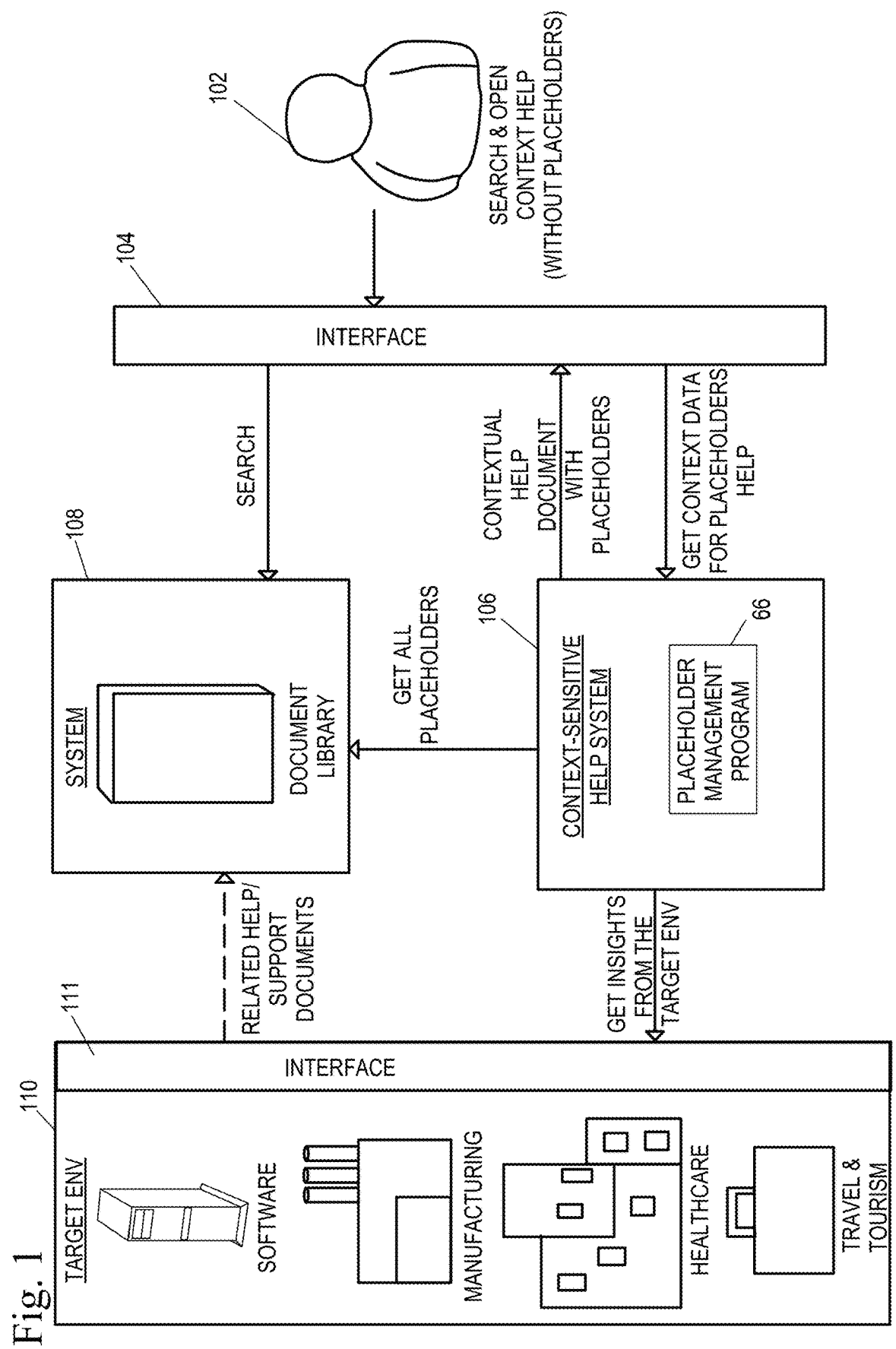
FIG. 1 shows a schematic of an overview of the dynamic, customized, context-sensitive help system for obtaining insights.

In the depicted example, network data processing system 51 uses the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

FIG. 13 illustrates internal and external components of the device computer 52 and server computer 54 in which illustrative embodiments may be implemented. In FIG. 12, the device computer 52 and the server computer 54 include respective sets of internal components 800a, 800b, and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, placeholder management program 66 are stored on at least one of one or more of the computer-readable tangible storage devices 830 for execution by at least one of one or more of the processors 820 via at least one of one or more of the RAMs 822 (which typically include cache memory). In the embodiment illustrated in FIG. 13, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Placeholder management program 66 can be stored on at least one of one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Placeholder management program 66 can be downloaded to device computer 52 and server computer 54 from an external computer via a network (for example, the Internet, a local area network or other, wide area network) and network adapter or interface 836. From the network adapter or interface 836, device monitor program 66 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Placeholder management program 66 can be written in various programming languages including low-level, high-level, object-oriented or non object-oriented languages. Alternatively, the functions of placeholder management program 66 can be implemented in whole or in part by computer circuits and other hardware (not shown).

Referring to FIG. 1, a target environment 110 is in communication with a SYSTEM 108 through an interface 111, which provides help and support documents which may be stored a document library. The document library is searchable through an interface 104 by a user 102 and also provides placeholders to a context-sensitive help system 106. The context-sensitive help system 106 includes a placeholder management program 66 and is also accessible through an interface 104 by the user 102. The context-sensitive help system 106 obtains insights from the target environment 110 and obtains placeholders from the SYSTEM 108. The interface 104, 111 may be a command line interface, a graphical user interface (GUI), or a web user interface (WUI). The target environment 110 may be any industry complex and distributed environment; software, manufacturing, healthcare and travel and tourism are listed as examples and do not limit the industry in which the invention is applicable. While the SYSTEM 108 is shown as being separate from the context-sensitive help system 106 in the figures, these systems may be one system.

The context-sensitive help system 106 enables a user to view a help document in a contextual manner by dynamically extracting relevant insights from the target environment 110 and using these insights to replace placeholders present in the documents of the document library of the SYSTEM 108. For example, while working with a database server DB005234, the context-sensitive help system 106 will automatically display "Db2Inst1" as the value, instead of "DBINSTANCE" in the description of the help document.

It should be noted that the context-sensitive help system 106 optimally extracts insights from the target environment 110 relevant for placeholders used in the documents in an unobtrusive manner, thereby not affect the performance of the target environment 110.

The context-sensitive help system 106 stores the insights extracted from the target environment 110, and keeps it up-to-date, because the state of the target environment 110 is dynamic and changes are frequent. For example, if the target environment 110 is unavailable (e.g. offline), the insight stored by the context-sensitive help system 106, is still useful to a user 102, such as an IT engineer.

Figure 3:
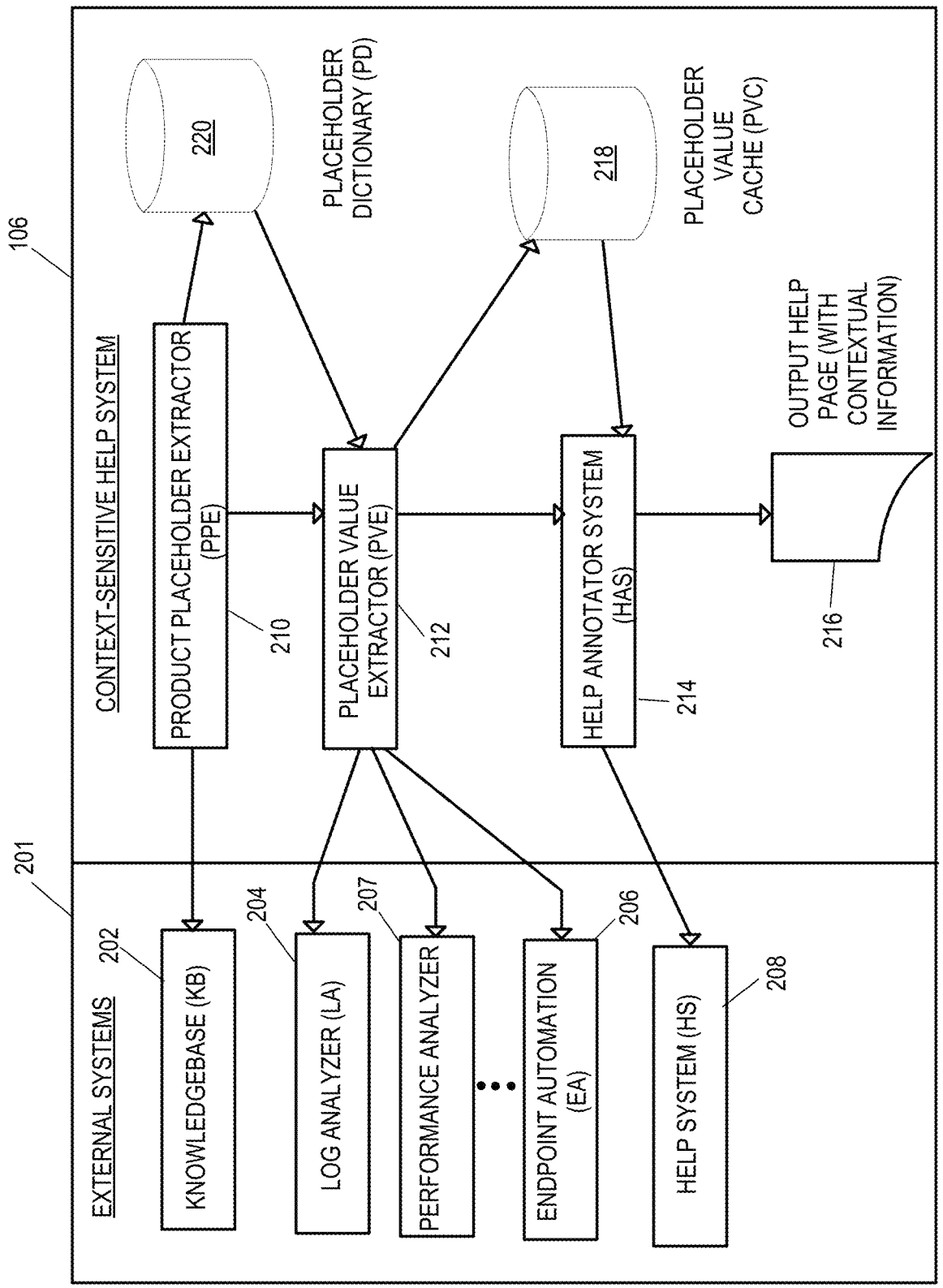
FIG. 3 shows a schematic of the interaction between the context-sensitive help system and external systems.

Referring to FIG. 3, which shows a schematic of the interaction between the context-sensitive help system 106 and external systems 201. The context-sensitive help system 106 leverages existing monitoring systems and related analysis tools to unobtrusively gain insights/context about the target environment 110. It should be noted that the placeholder management program 66 may control the product placeholder extractor (PPE) 210, placeholder dictionary (PD) 220, placeholder value extractor (PVE) 212, placeholder value cache (PVC) 218, and help system annotator (HAS) 214 of the context-sensitive help system.

The external systems 201 include at least a knowledgebase (KB) 202, log analyzer (LA) 204 endpoint automation (EA) 206, performance analyzer tool 207 and help system (HS) 208. The external systems 201 may include other tools or systems not shown, for example additional tools for analyzing a system.

The knowledgebase (KB) 202 consists of TechNotes and documents published by product vendors or service providers describing procedures and solutions to known problems. These documents use a standard format and style to identify product names, version, etc . . . and placeholders and/or configuration parameters used by the product.

The log analyzer (LA) 204 is a tool used to analyze, annotate and extract useful information, such as problems, issues and symptoms. The log analyzer 204 also contains information about configuration values used by the product, for example INSTALL_DIR, JAVA_HOME, etc . . . .

The performance analyzer 207 is a tool used to analyze performance of a system.

The end point automation (EA) 206 is a system used to perform certain actions or tasks on the endpoints or servers. The endpoint automation 206 can be used to run specific commands that can either emit the configuration data into the log files or return the configuration values from the endpoint.

The help system (HS) 208 is a tool that obtains a list of documents from the knowledgebase 202 based on a search of query criteria. The help system 208 may also obtain individual documents.

The context-sensitive help system 106 includes at least a product placeholder extractor (PPE) 210, a placeholder dictionary (PD) 220, a placeholder value extractor (PVE) 212, a placeholder value cache (PVC) 218, and a help system annotator (HAS) 214 to output a help page with contextual information 216 to a user 102.

The product placeholder extractor (PPE) 210 periodically crawls the documents (TechNotes, Troubleshooting Guides, etc.) in the KB 202 for each product and extracts 'placeholder' text (e.g. [JAVA_HOME], [INSTALL_DIR], etc . . . ) from these documents and stores them in the placeholder dictionary 220. The PPE 220 also uses text patterns for different products. The text patterns could be capitalized words in a box bracket, words starting with S or %, capitalized words in a specific font, or other such patterns.

The placeholder dictionary (PD) 220 is a repository which stores the list of 'placeholder' text used in the product documentation along with the index of documents. The PD 220 may also store rules to extract the value of the placeholder from a log message in the product log file, extract the value of the placeholder directly from the product using the endpoint automation (EA) 206, for example through a [GetValue Command] Alternatively, the PD 220 emits the value of the placeholder into the log file of the product, for example through a [EmitValue Command] executed by the EA 206, which can then be extracted using a [ValuePattern]. The PD 220 may be repository 53 of FIG. 12.

The placeholder value extractor (PVE) 212 extracts the values for the placeholder for the product instance or deployment from the log files (or output of commands) and stores the value in the placeholder value cache (PVC) 218. The PVE 212 also uses the [ValuePattern] rule or command stored in the placeholder dictionary 220 to extract the configuration values.

The placeholder value cache (PVC) 218 is a repository which stores placeholder values for all of the product instances or deployment in the target environment 110. The PVC 218 may be repository 53 of FIG. 12.

The help system annotator (HAS) 214 intercepts search requests from the log analyzer 204 and annotates the search request and the response document. For example, the HAS 214 annotates the search request with additional context information, based on knowledge from the placeholder dictionary 220. In a specific example, a search for "message-id:IC$_{69428}$" would be annotated with additional context, such as 'OS:Linux, OS:RHEL, Version:6.1.0.1'. The HAS 214 may also annotate the placeholders in the search results or help document with configuration values that are relevant to the target environment 110, for example automatically display the "Db2Inst1" as the value instead of "DBINSTANCE" in the description.

Therefore, the context-sensitive help system 106 may use rules to extract configuration values from the log files and rules to extract the state of the target environment 110 from the monitoring data (availability, performance, utilization, etc.). The context-sensitive help system 106 also leverages additional automation & knowledge provided by the IT engineer, to automatically gain insights about the target environment 110. Dependencies between products/components and the underlying IT environment as well as dependencies between configuration parameters may also be leveraged. For example, dependencies between the products and the underlying IT environment may include parent-child relationship between WebSphere®, DB2®, the underlying OS, etc. Dependencies between the configuration parameters may be expressed in the form of formulae, tabulation, etc., in order to determine a configuration value from the other configuration parameters/values.

The context-sensitive help system 106 allows queries through an application programming interface or command line interface to query the target environment 110 about the configuration settings directly (synchronously) or indirectly (triggering the system to emit the value into the log files).

The context-sensitive help system 106 may be used to automatically provide additional context/insight to the system administrator, while searching for help/runbook information (for example, search for TechNotes having message-id: IC69428, with context as 'Linux'). The context-sensitive help system 106 may also be used to automatically update the help document with the relevant insight/context data (for example, automatically display the "Db2Inst1" as the value, instead of SDB2INSTANCE in the description). Additionally, the context-sensitive help system 106 may also automatically pre-fill the parameter values for runbook automation (for example, automatically pre-fill the automation URL/GUI Form/response-files with the name of database instance "Db2Inst1").

Figure 4:
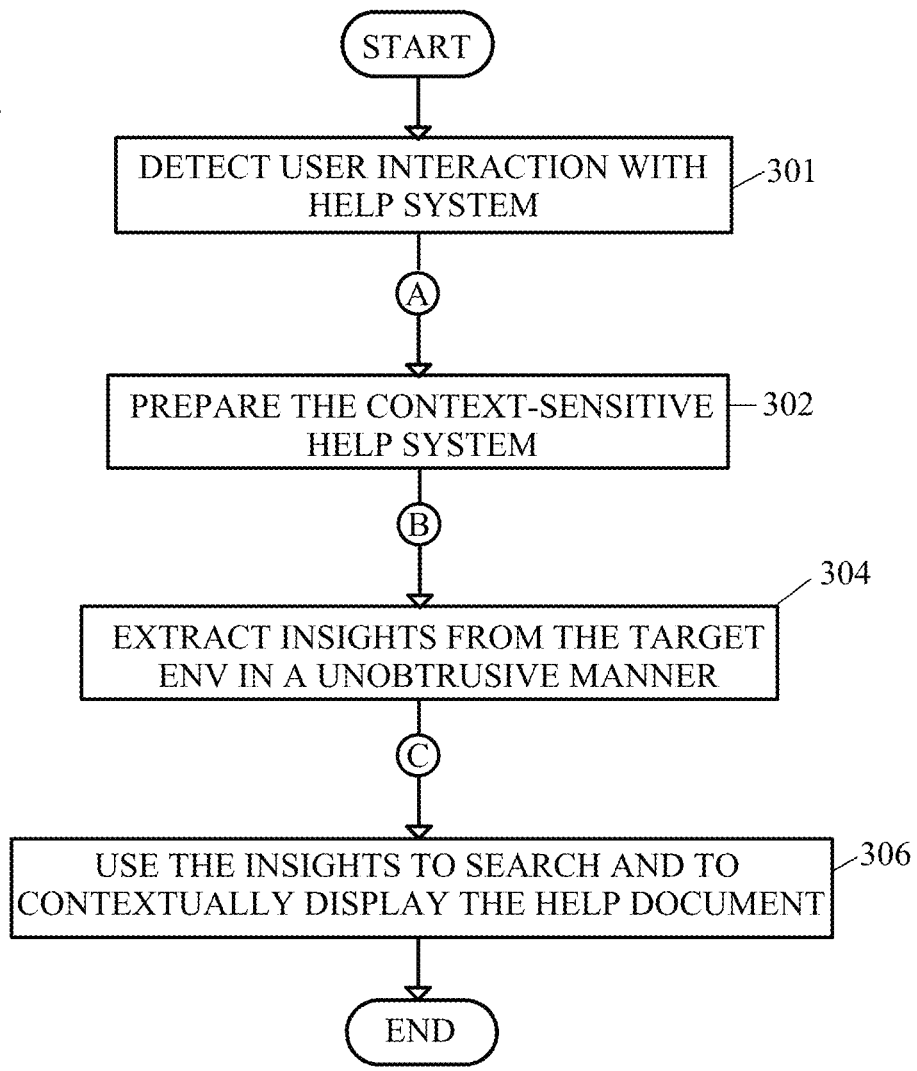
FIG. 4 shows a flow diagram of a method of obtaining insights for the dynamic, customized, context-sensitive help system.
Figure 5:
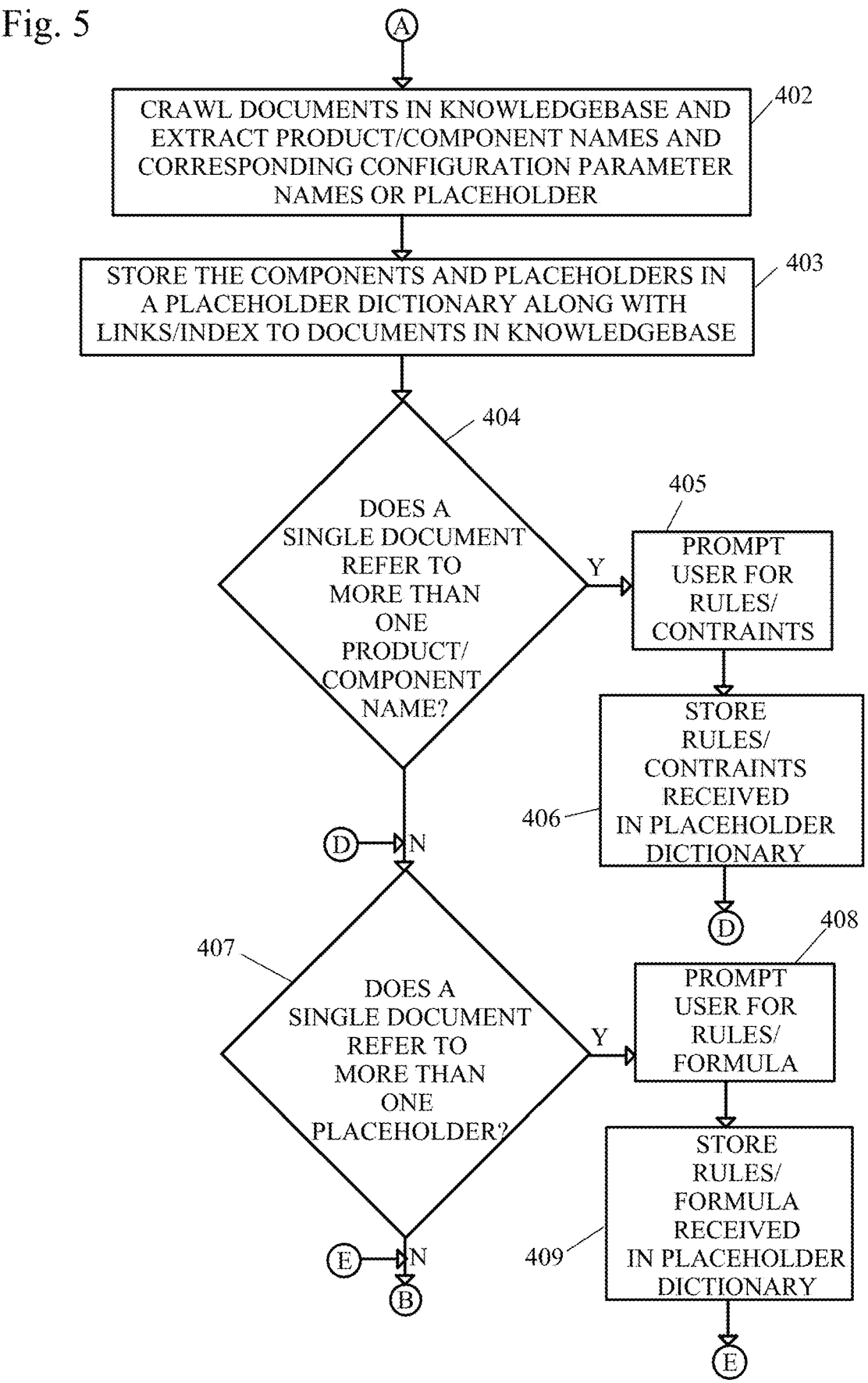
FIG. 5 shows a flow diagram of a method of preparing the insight for context help system.
Figure 6:
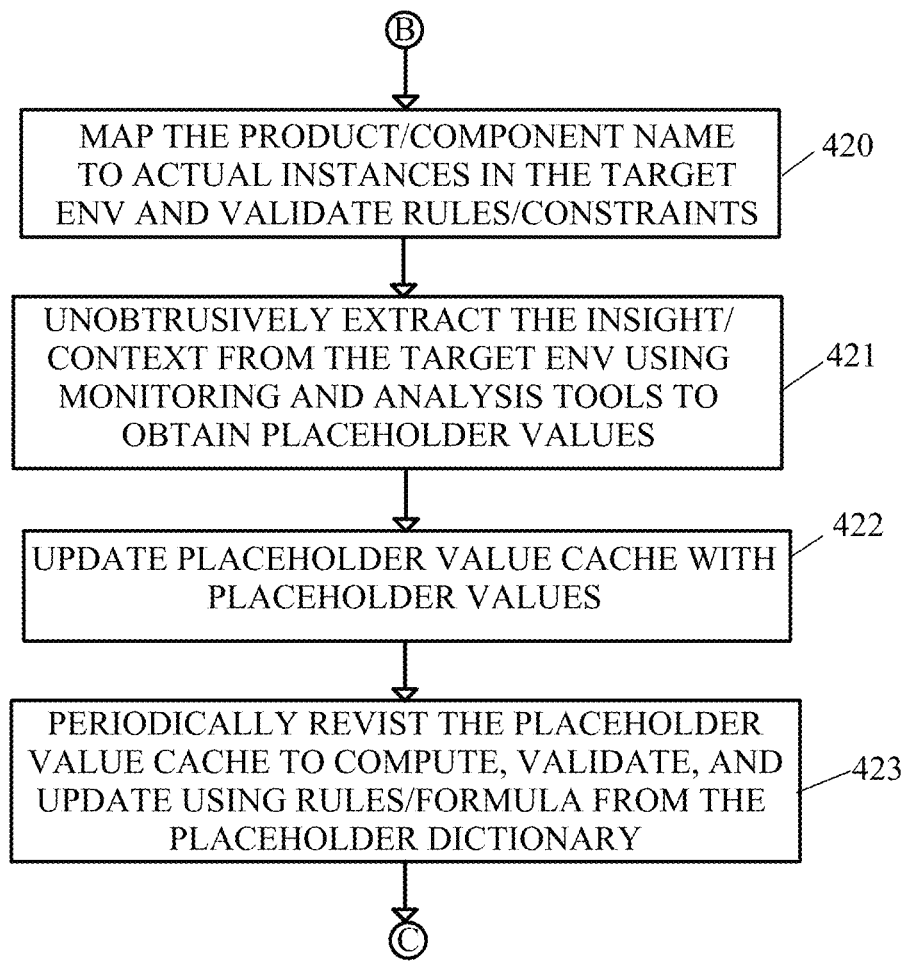
FIG. 6 shows a flow diagram of a method of extracting insights from the target environment in a unobtrusive manner.
Figure 7:
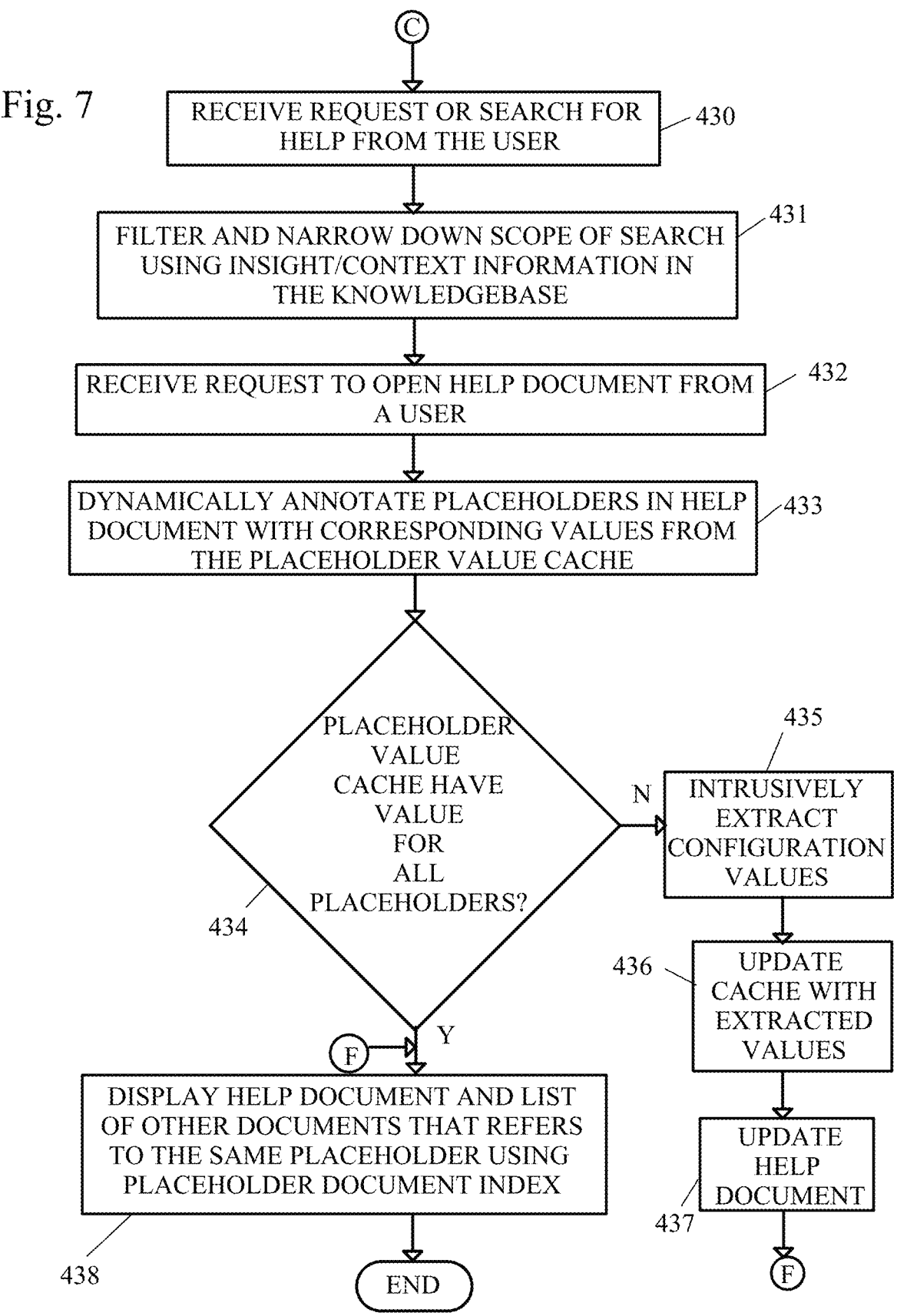
FIG. 7 shows a flow diagram of a method of using insights to search and to contextually view the help document when the contextual help is in the form of dynamic placeholder replacement, computed placeholder values, or offline placeholder replacement.
Figure 8:
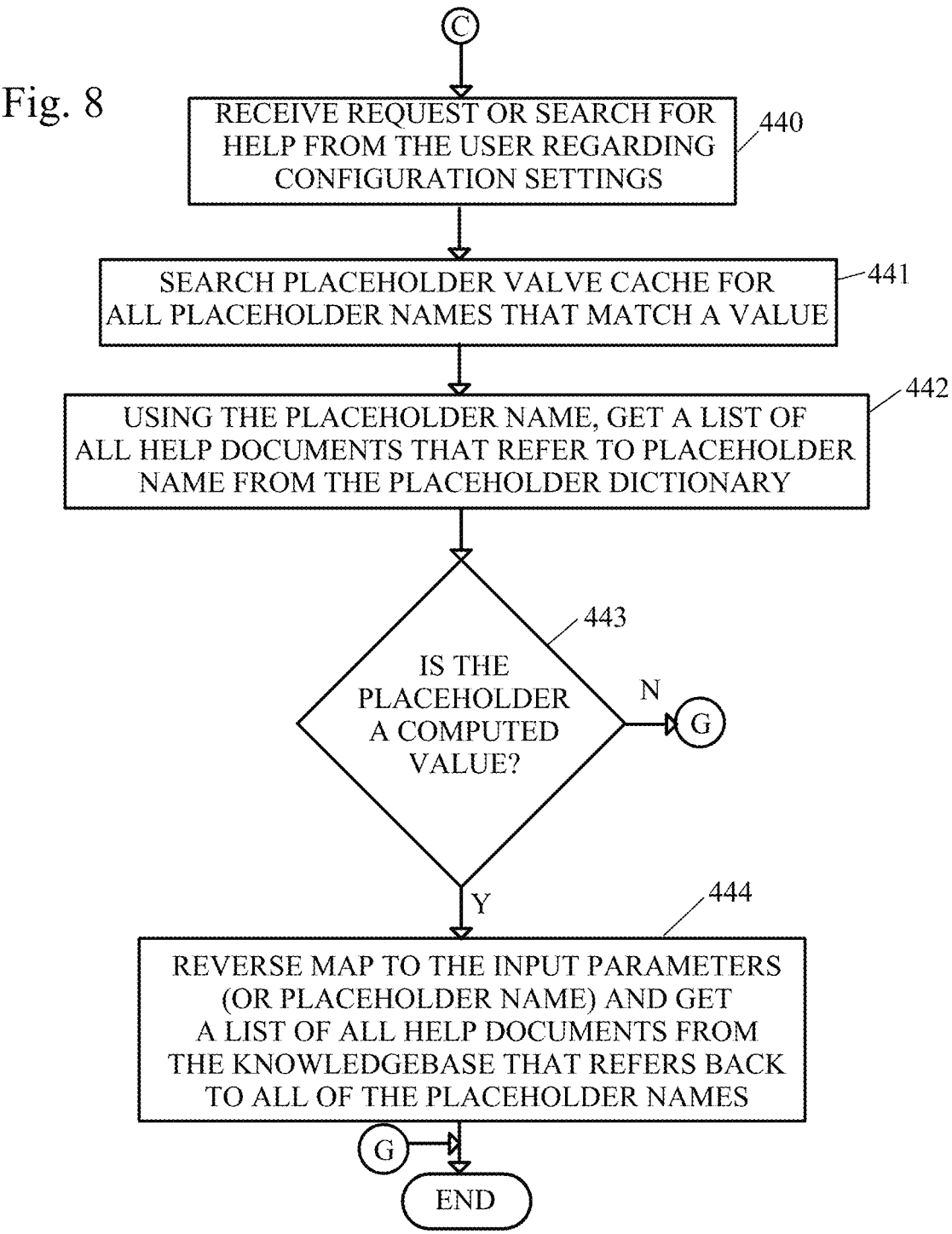
FIG. 8 shows a flow diagram of a method of using insights to search and to contextually view the help document when the placeholder values are being used to contextually search for help documents.
Figure 9:
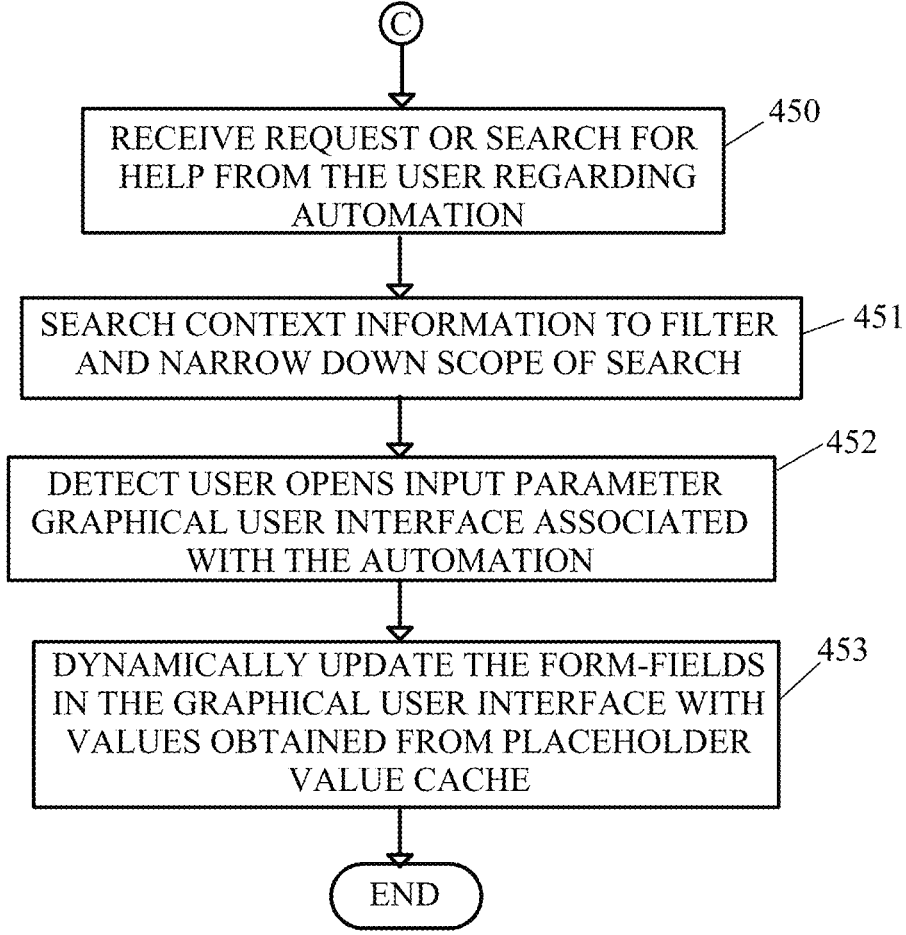
FIG. 9 shows a flow diagram of a method of using insights to search and to contextually view the help document when dynamic placeholder replacement is used for contextual automation.

FIG. 4 shows a flow diagram of a method of obtaining insights for the dynamic, customized, context-sensitive help system. In a first step, the context-sensitive help system 106 detects a search or opening of a help document by a user 102 (step 301). The context-sensitive help system 106 is then prepared (step 302), for example by the placeholder management program 66. The sub-steps 402-409 for preparing the context-sensitive help system 106 are shown in FIG. 5 and are discussed in greater detail below. Next, insights from the target environment 110 are extracted in an unobtrusive manner (step 304), for example by the placeholder management program 66. The sub-steps 420-423 for extracting insights from the target environment 110 in an unobtrusive manner are shown in FIG. 6 and are discussed in greater detail below. Then, the insights are used to search and to contextually display the help document to a user (step 306) through the placeholder management program 66 of the context-sensitive help system 106 and the method ends. Depending on what is detected in step 301, based on user input, the sub-steps for searching using the insights and contextually displaying the help document (step 306) will vary. The different sub-steps are shown in FIGS. 7-9 and are discussed in greater detail below.

FIG. 5 shows the sub-steps of step 302 of preparing the context-sensitive help system 106.

The product placeholder extractor (PPE) 210 of the placeholder management program 66 crawls documents in the knowledgebase 202 and extracts product/component names and corresponding configuration parameters or placeholder text (step 402). The placeholders may be extracted from the product documentation using a specific format, for example [PLACEHOLDER], % PLACEHOLDER, ${PLACEHOLDER}. In addition, keywords like heap size, ulimit value, etc., can be extracted from documents in an automated manner from the product documentation, for example using the IBM Watson cognitive system, a technology platform that uses natural language processing and machine learning to reveal insights from large amounts of unstructured data.

The extracted placeholders and components are stored in a placeholder dictionary (PD) 220 along with links or an index to help documents in the knowledgebase (KB) 202 (step 403). A user, for example user 102 or another user who may be a subject matter expert of a product, may update the placeholder dictionary with additional knowledge regarding the placeholder.

If a single document references more than one product or component name (step 404), the user is prompted for rules or constraints that describe or define the dependencies between entities (step 405). The dependencies may include a parent-child hierarchy, 1-n, optional and mandatory relationships, etc. The received rules and constraints are stored in a placeholder dictionary (PD) 220 (step 406) and the method continues to step 407.

Figures 10, 11:
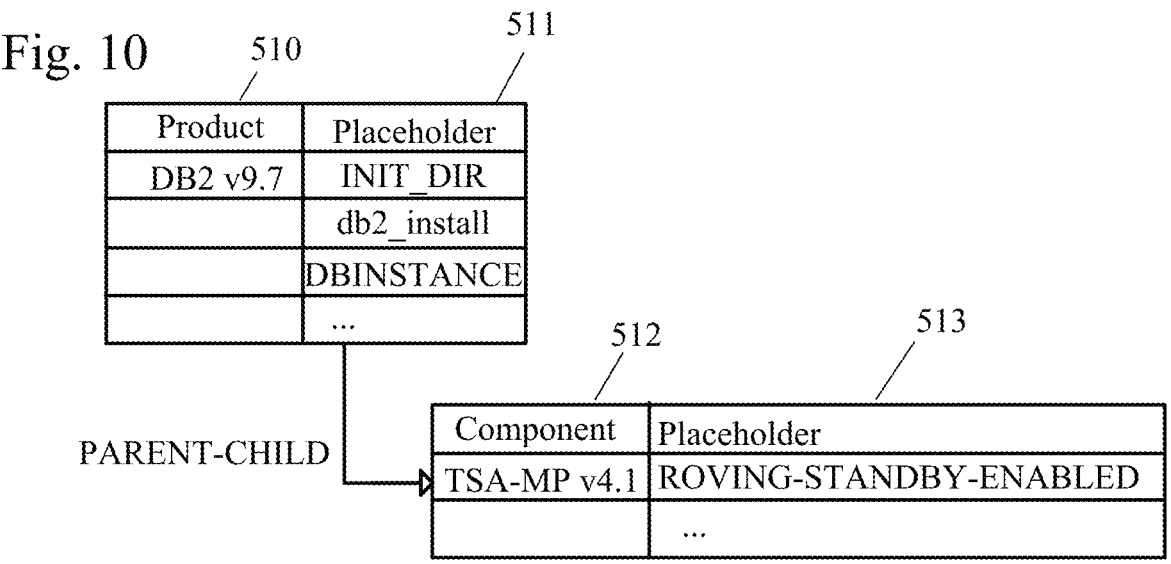
FIG. 10 shows an example of preparing the insight for context help system showing the relationship between product, component and placeholders.
FIG. 11 shows an example of preparing the insight for context help system showing the relationship between placeholders.

For example, a table as shown in FIG. 10 may be generated to indicate the relationship between product 510, component 512, and placeholders 511, 513. In this example, the DB2 v9.7 shares a parent-child relationship with the component TSA-MP v4.1.

If a single document does not reference more than one product or component name (step 404) and the single document does not refer to more than one placeholder (step 407), the method continues to step 304 of extracting insights from the target environment 110 in an unobtrusive manner.

If a single document does refer to more than one placeholder (step 407), the user is prompted for rules or formulae that define or describe the dependencies between the placeholders (step 408). The received rules or formulae are stored in a placeholder dictionary 220 (step 409) and the method continues to step 304 of extracting insights from the target environment 110 in an unobtrusive manner.

For example, a table as shown in FIG. 11 may be generated to indicate the relationship between placeholders based on an associated formula. The formula in Table of FIG. 11 is:

$$\text{Thread\_Pool\_Size} = f(\text{No\_Of\_Core}, \text{AVG\_CPU}, \text{Util})$$

In another example, the following information in product documentation can be used to capture rules/constraints in the placeholder dictionary 220:

In terms of sizing the heap: Java heap should be sized for 40-70% of average memory use.

$$\text{Rule: HEAP\_SIZE} \rightarrow [0.4*\text{AVg\_Memory\_Size}, 0.7*\text{Avg\_Memory\_Size}]$$

FIG. 6 shows the sub-steps of step 304 of extracting insights from the target environment in an unobtrusive manner. The placeholder management program 66 maps the product or component name to actual instances in the target environment 110 and validates the rules or constraints describing the relationship between them (step 420). Step 420 may be carried out using existing tools or IBM's Tivoli® Application Dependency Discovery Manager (TADDM), tool that aggregates configurations of applications and their dependencies and helps one understand said configurations with reports, graphs, and other auditing tools. The placeholder management program 66 uses analysis tools and monitoring, for example the placeholder value extractor (PVE) 212, to unobtrusively extracts the insight or context from the target environment to obtain placeholder values (step 421). The placeholder value cache (PVC) 218 is updated with the insights/context which act as placeholders (step 422). The placeholder management program 66 periodically revisits the placeholders cache to compute, validate, and updates the placeholder value cache using realest and formulae in the placeholder dictionary (step 423) and the method continues to step 306.

For example, the HEAP_SIZE placeholder would be computed using the rule/formula involving NO_OF_USERS, NO_OF_CONNECTION, etc., as its parameter. The HEAP_SIZE setting is verified as to whether it is adhering to the rule:

$$\text{Rule: HEAP\_SIZE} \rightarrow [0.4*\text{AVg\_Memory\_Size}, 0.7*\text{Avg\_Memory\_Size}]$$

If the HEAP_SIZE setting is not valid, it may be displayed to the user in a manner different than other values in the help document.

The above information would be distributed to the log analyzer (LA) 204 to alert the Context-sensitive help System 106 and the endpoint automation (EA) 206 to run the automation that will extract configuration data from the target environment 110.

The LA 204 would be initialized with the [ValuePattern] definition to raise a Value-Alert, if the value of the specific placeholders is available in the log file for the product instance, for example by the placeholder value extractor (PVE) 212. The LA 204 would also be initialized with a [RefreshEvent] pattern definition to raise a Refresh-Alert if the log pattern or timer for the placeholder is available in the log file for the product instance, for example by the placeholder value extractor (PVE) 212. The end point automation (EA) 206 would be initialized with the [EmitValueCmd] command/script that ensures that the log file has a value for the placeholder whenever it is triggered. The EA 206 would also be initialized with the [GetValueCmd] command script to obtain the placeholder values directly from the target environment 110 if the [ValuePattern] or [EmitValueCmd] is not sufficient. Further the PVC 218 would be initialized with blank placeholder values for each product instance in the target environment 110, for example by the PVE 212.

For example in the following db2diag.log file, <ValuePattern>rules can be defined to extract the following configuration values/placeholder:
   Log File:
   2007-05-18-14.20.46.973000-240 I27204F655 LEVEL: Info
   PID: 3228 TID: 8796 PROC: db2syscs.exe
   INSTANCE: DB2MPP NODE: 002 DB: WIN3DB1
   APPHDL: 0-51 APPID: 9.26.54.62.45837.070518182042
   AUTHID: UDBADM
   EDUID: 8796 EDUNAME: db2agntp (WIN3DB1) 2
   FUNCTION: DB2 UDB, data management, sqldInitDBCB, probe:4820
   DATA #1: String, 26 bytes
   Setting ADC Threshold to:
   DATA #2: unsigned integer, 8 bytes
   1048576
   <ValuePattern rules>:
   PROC: <procName>
   INSTANCE: <instance>
   NODE: <node>
   DB: <database>
   APPID: <appID>
   AUTHID: <authID>

Similarly, in another example, the ULIMIT value may be calculating using a table provided in the support documentation.

FIG. 7 shows the sub-steps of step 306 of using insights to search and to contextually display the help document to a user when a user searches for help documentation or needs contextual help using dynamic placeholder replacement, contextual help using computer placeholder values or offline placeholder replacement. The help annotator system (HAS) 214 of the placeholder management program 66 receives or intercepts a request for a search for help from the user received by the help system HS 208 (step 430). The HAS 214 filters and narrows the scope of the search using insight/context information in the knowledgebase (KB) 202 (step 431). For example, a search for "message-id: IC69428" will be annotated with additional context such as 'OS:Linux, OS:RHEL, Version: 6.1.0.1'.

The HAS 214 receives a request to open a help document from the user from step 301 (step 432). The HAS dynamically annotates placeholders in help documents with corresponding values from the context/insight cache (step 433). For example, the URLs in the search result are encoded with the URL for HAS 214 (parameterized with URL of the original document), in such a way that the HTTP request will reach HAS 214 first before going to the knowledgebase 202 for the help document 216.

If the placeholder value cache has a value for all placeholders (step 434), the HAS displays the help document and a list of other documents that refers to the same placeholder using the placeholder document index (step 438) and the method ends.

When a user selects a document from the list of other documents, HAS 214 will behave like a proxy for obtaining the document from KB 202. HAS 214 will use the document index maintained in the PD 220 to obtain the values for the relevant placeholder from the PVC 218. If the value in PVC 218 is not updated, then the PVE 212 is used to run the 'GetValueCmd' (for the Placeholder) on the target environment 110 to extract the value. This value is used to dynamically modify the document to either replace (or annotate) the placeholders in the document with the corresponding values.

If the placeholder value cache 218 does not have a value for all placeholders (step 434), the configuration values are intrusively extracted (step 435), the cache is updated with the extracted values (step 436), and the help document is updated (step 437) and the method continues to step 438.

Figure 2:
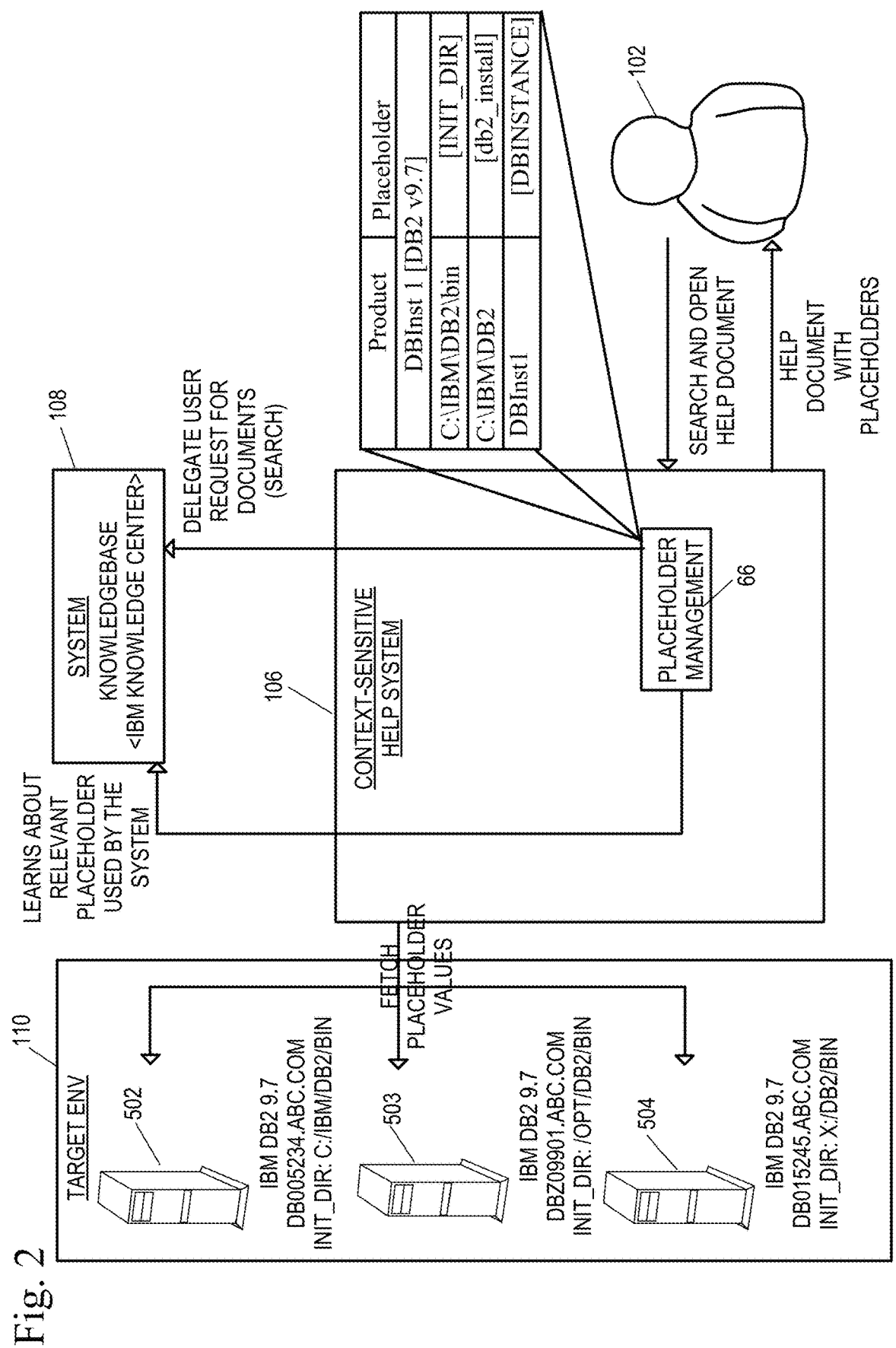
FIG. 2 shows a schematic of an example a user using the dynamic, customized, context-sensitive help system to obtain insights by extracting insights from the target environment in an unobtrusive manner using a placeholder management program.

Referring to FIG. 2, during the scenario of contextual help using dynamic placeholder replacement, a user 102 is a DB2 Administrator managing multiple instances of a DB2® Relational Database Management System (RDBMS) from IBM Corporation, which are running on a number of servers. The user is analyzing a problem on one of the servers, DB005234.abc.com 502. The user 102 has not directly logged into the problematic server 502, but is instead using the central diagnostic tool, for example a Log Analyzer 204. Using the context from the log analyzer 204, e.g. DBInst1 on DB005234.abc.com 502, the user opens a TechNote or troubleshooting document using the context-sensitive help system 106. The user 102 is able to view the TechNote with the configuration state of DBInst1, shown in the table of FIG. 2, on DB005234.abc.com, since the context-sensitive help system 106 has dynamically updated the document with the appropriate placeholder values. If the user 102 switches to another instance of DB2, for example DBInst2 on DBZ09901.abc.com 503 or DB015245.abc.com 504 and opens the same TechNote, the user 102 will be able to view the TechNote with the configuration state of DBInst2 on DBZ09901.abc.com or on DB015245.abc.com.

During the scenario of contextual help using computed placeholder values, a user is Websphere administrator managing multiple instances of webspheres. The user 102 may be analyzing a performance issue with a websphere instance using a central diagnostic tool, for example a performance analyzer tool 207, part of the external systems 201. Using the context from the performance analyzer tool 207, the user 102 opens an administrative guide using the context-sensitive help system 106. The user 102 is now able to view the dynamically computed (actual and recommended) configuration settings (e.g. JVM HEAP_SIZE), based on monitored utilization data (e.g. CPU, number of active users, number of cores, etc . . . ) from the target environment 110. An advantage of using the method of present invention is that the user 102 is able to view the computed configuration settings from the context-sensitive help System 106 instead of only the configuration name, which eliminates the need for the user to use multiple tools to collect all of the relevant data in order to compute the configuration state.

During a scenario of offline placeholder replacement, a user 102 is a zOS administrator managing multiple logical partitions (LPARs). The user 102, while working on a major incident where the LPAR has crashed, has to follow a manual procedure in a runbook to restart the server. Using the context from the major incident (e.g. information in the ticket data), the user 102 opens the runbook document using the context-sensitive help system 106 and is able to view the runbook with the configuration state of the LPAR before it crashed. The context-sensitive help system 106 dynamically updates the runbook document with the appropriate placeholder values that was cached prior to the crash.

FIG. 8 shows the sub-steps of step 306 of using insights to search and to contextually display the help document 216 to a user 102 when a contextual search is requested by the user using placeholder values. The HAS 214 receives a request or search for help from the user 102 regarding configuration settings (step 440). The HAS 214 searches the placeholder value cache 218 for all placeholders names that match a value (step 441). The HAS 214 uses the placeholder name to get a list of all help documents that refer to a placeholder name from the placeholder dictionary 220 (step 442). If the placeholder is not a computed value (step 443), the method ends. If the placeholder is a computed value (step 443), the HAS 214 reverse maps the input parameters or placeholder name to get a list of all help documents from the knowledgebase 202 that refers back to all of the placeholder names (step 444) and the method ends.

During the scenario of using placeholder values during a contextual search, a user 102 may be analyzing the log files of DB2 HADR and performing a health check and sees the following log message:

2013-10-07-14.40.35.450719-420 E68393E386 LEVEL: Event
PID: 4737 TID: 46914980538688PROC: db2sysc
INSTANCE: zhuge NODE: 000 DB: HADRDB
EDUID: 524 EDUNAME: db2hadrp (HADRDB)
FUNCTION: DB2 UDB, High Availability Disaster Recovery,
hdrSetDbRole, probe:10010
CHANGE: HADR role set to Primary (was Standard)

The user 102 now wishes to search all TechNote documents that are related to the bolded string using the context-sensitive help system 106. The context-sensitive help system 106 automatically maps "zhuge", "000" and "HADRDB" to the corresponding placeholder name (DBINSTANCE, NODENAME, SCHEMA), before searching the knowledgebase 202, returning documents using the configuration values or current state of the target environment 110.

FIG. 9 shows the sub-steps of step 306 of using insights to search and to contextually display the help document 216 to a user 102 when dynamic placeholder replacement for contextual automation. The HAS 214 receives a request or search for help from the user 102 regarding automation (step 450). The HAS 214 searches for context information to filter and narrow down the scope of the search (step 451). The HAS 214 detects a user 102 opening input parameters in a graphical user interface associated with the automation (step 452). The HAS 214 dynamically updates the form fields in the graphical user interface with values obtained from the placeholder value cache 218 (step 453) and the method ends.

During the scenario of contextual automation using dynamic placeholder replacement, a user 102 may be a UNIX system administrator managing multitudes of servers. After analyzing a problem in UX005234.abc.com, using a central diagnostic tool, for example a log analyzer 204, the user 102 has to take a corrective action using an automation prescribed by the Operations Guide. The user 102 opens the automation with a web interface using the context-sensitive help system 106 with the context from the log analyzer tool 204. The context-sensitive help system 106 automatically and contextually pre-fills the input parameter for the automation in the web GUI form with the placeholder values, which are is computed or as-is. By using the context-sensitive help system 106 with the automation, the user 102 does not have using any additional manual inferencing to take corrective action.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of using a context-sensitive help system for obtaining insights in an unobtrusive manner from a target environment representative of a complex and distributed environment managed by a user so as to prevent deterioration of a performance of the target environment, using a product placeholder extractor to extract placeholders from within the target environment, the placeholder extractor in communication with a knowledgebase of an external system and in communication with a placeholder dictionary comprising a repository of extracted placeholders used in product documentation associated with the target environment, an index of documents, and rules associated with extracting a value of the placeholders or from a log message, a placeholder value extractor to extract values of the placeholders or the log message in communication with the product placeholder extractor, the placeholder dictionary, other external systems, and a placeholder value cache comprising a repository storing extracted values representative of the placeholders or the log messages, a help annotator system in communication with the placeholder value cache, the placeholder value extractor and other external systems; the method comprising the steps of a computer of the context-sensitive help system:

detecting a search or opening of a help document containing a plurality of placeholders and product/component names by a user through an interface;

crawling documents in the knowledgebase and extracting product and/or component names and corresponding configuration parameters or placeholders;

storing the product and/or component names and placeholders in the placeholder dictionary along with links and an index to documents in the knowledgebase;

extracting insights from the target environment in an unobtrusive manner; and replacing placeholders in the help document with values from the target environment based on the insights from the target environment comprising the steps of:

receiving a request or search for help from the user regarding configuration settings of at least one component of the target environment;

searching the placeholder value cache for all placeholder names that match a value;

using the placeholder name to obtain a list of all help documents which refer to the placeholder name from the placeholder dictionary; and if the placeholder is a computed value, the computer reverse mapping the placeholder to placeholder names and getting a list of all help documents which refer back to all of the placeholder names; and displaying the help document to the user through the interface.

2. The method claim 1, further comprising the steps of:

if a single document refers to more than one product or component name, the computer prompting the user for rules and storing the received rules in the placeholder dictionary; and if the single document refers to more than one placeholder, the computer prompting the user for rules and storing the rules in the placeholder dictionary.

3. The method of claim 1, wherein the step of the computer extracting the insights from the target environment in an unobtrusive manner comprises the steps of the computer of the context-sensitive help system:

mapping the product and/or component name to actual instances in the target environment and validating rules regarding whether more than one product or component name is present in a single document in the knowledgebase or more than one placeholder in a single document in the knowledgebase;

unobtrusively extracting the insight or context from the target environment using monitoring and analysis tools to obtain placeholder values; and updating the placeholder value cache with the placeholder values obtained.

4. The method of claim 3, further comprising the step of the computer periodically revising the placeholder value cache to compute, validate and update the placeholders using the rules from the placeholder dictionary.

5. The method of claim 1, wherein displaying the help document to the user through the interface further comprises the step of displaying a list of other documents that refer to the placeholders in the help document using a placeholder document index.

6. A method of using a context-sensitive help system for obtaining insights in an unobtrusive manner from a target environment representative of a complex and distributed environment managed by a user so as to prevent deterioration of a performance of the target environment, using a product placeholder extractor to extract placeholders from within the target environment, the placeholder extractor in communication with a knowledgebase of an external system and in communication with a placeholder dictionary comprising a repository of extracted placeholders used in product documentation associated with the target environment, an index of documents, and rules associated with extracting a value of the placeholders or from a log message; a placeholder value extractor to extract values of the placeholders or the log message in communication with the product placeholder extractor, the placeholder dictionary, other external systems, and a placeholder value cache comprising a repository storing extracted values representative of the placeholders or the log messages; a help annotator system in communication with the placeholder value cache, the placeholder value extractor and other external systems; the method comprising the steps of a computer of the context-sensitive help system:

detecting a search or opening of a help document containing a plurality of placeholders and product/component names by a user through an interface;

crawling documents in the knowledgebase and extracting product and/or component names and corresponding configuration parameters or placeholders;

storing the product and/or component names and placeholders in the placeholder dictionary along with links and an index to documents in the knowledgebase;

extracting insights from the target environment in an unobtrusive manner; and replacing placeholders in the help document with values from the target environment based on the insights from the target environment comprising:

receiving a request or search of help from the user regarding automation;

filtering and narrowing down a scope of the search received from the user using insight and context information in the knowledgebase;

detecting if a user opens an input parameter through an interface associated with the automation; and dynamically updating fields of the interface with values obtained from the placeholder value cache; and displaying the help document to the user through the interface.

7. The method claim 6, further comprising the steps of:

if a single document refers to more than one product or component name, the computer prompting the user for rules and storing the received rules in the placeholder dictionary; and if the single document refers to more than one placeholder, the computer prompting the user for rules and storing the rules in the placeholder dictionary.

8. The method of claim 6, wherein the step of the computer extracting the insights from the target environment in an unobtrusive manner comprises the steps of the computer of the context-sensitive help system:

mapping the product and/or component name to actual instances in the target environment and validating rules regarding whether more than one product or component name is present in a single document in the knowledgebase or more than one placeholder in a single document in the knowledgebase;

unobtrusively extracting the insight or context from the target environment using monitoring and analysis tools to obtain placeholder values; and updating the placeholder value cache with the placeholder values obtained.

9. The method of claim 8, further comprising the step of the computer periodically revising the placeholder value cache to compute, validate and update the placeholders using the rules from the placeholder dictionary.

10. The method of claim 6, wherein displaying the help document to the user through the interface further comprises the step of displaying a list of other documents that refer to the placeholders in the help document using a placeholder document index.

11. A computer program product for using a context-sensitive help system for obtaining insights in an unobtrusive manner from a target environment representative of a complex and distributed environment managed by a user so as to prevent deterioration of a performance of the target environment, using a product placeholder extractor to extract placeholders from within the target environment, the placeholder extractor in communication with a knowledgebase of an external system and in communication with a placeholder dictionary comprising a repository of extracted placeholders used in product documentation associated with the target environment, an index of documents, and rules associated with extracting a value of the placeholders or from a log message; a placeholder value extractor to extract values of the placeholders or the log message in communication with the product placeholder extractor, the placeholder dictionary, other external systems, and a placeholder value cache comprising a repository storing extracted values representative of placeholders or the log messages, a help annotator system in communication with the placeholder value cache, the placeholder value extractor and other external systems, the method comprising the steps of a computer of the context-sensitive help system comprising a computer comprising at least one processor, one or more memories, one or more computer readable storage media, the computer program product comprising a computer readable storage medium having program instructions embodied therewith, the program instructions executable by the computer to perform a method comprising:

detecting, by the computer, a search or opening of a help document containing a plurality of placeholders and product/component names by a user through an interface;

crawling, by the computer, documents in the knowledgebase and extracting product and/or component names and corresponding configuration parameters or placeholders;

storing, by the computer, the product and/or component names and placeholders in the placeholder dictionary along with links and an index to documents in the knowledgebase;

extracting, by the computer, insights from the target environment in an unobtrusive manner; and replacing, by the computer, placeholders in the help document with values from the target environment based on the insights from the target environment comprising the program instructions of:

receiving, by the computer, a request or search of help from the user regarding automation;

filtering and narrowing down, by the computer, a scope of the search received from the user using insight and context information in the knowledgebase;

detecting a user opens an input parameter, by the computer, through an interface associated with the automation; and dynamically updating, by the computer, fields of the interface with values obtained from the placeholder value cache; and displaying, by the computer, the help document to the user through the interface.

12. The computer program product of claim 11, wherein the program instructions of extracting, by the computer, the insights from the target environment in an unobtrusive manner comprises the program instructions of:

mapping, by the computer, the product and/or component name to actual instances in the target environment and validating rules regarding whether more than one product or component name is present in a single document in the knowledgebase or more than one placeholder in a single document in the knowledgebase;

unobtrusively extracting, by the computer, the insight or context from the target environment using monitoring and analysis tools to obtain placeholder values; and updating, by the computer, the placeholder value cache with the placeholder values obtained.

13. The computer program product of claim 12, further comprising the program instructions of periodically revising, by the computer, the placeholder value cache to compute, validate and update the placeholders using the rules from the placeholder dictionary.

14. The computer program product of claim 11, wherein displaying the help document to the user through the interface further comprises the program instructions of displaying, by the computer, a list of other documents that refer to the placeholders in the help document using a placeholder document index.

* * * * *